United States Patent
Oshin et al.

(10) Patent No.: US 12,380,077 B2
(45) Date of Patent: Aug. 5, 2025

(54) SYSTEM AND METHOD FOR AUTOMATED DISCOVERY OF FINE-GRAIN LINEAGE OF TRANSACTIONAL DATA

(71) Applicant: JPMorgan Chase Bank, N.A., New York, NY (US)

(72) Inventors: Olusegun Oshin, Edison, NJ (US); Colin E Alexander, Palm Harbor, FL (US); Anshul Agarwal, Ridgewood, NJ (US); Meisam Hosseini, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 31 days.

(21) Appl. No.: 18/197,379

(22) Filed: May 15, 2023

(65) Prior Publication Data
US 2024/0386005 A1    Nov. 21, 2024

(51) Int. Cl.
*G06F 16/22*    (2019.01)
*G06F 16/25*    (2019.01)

(52) U.S. Cl.
CPC .......... *G06F 16/221* (2019.01); *G06F 16/254* (2019.01)

(58) Field of Classification Search
CPC .............................. G06F 16/221; G06F 16/254
See application file for complete search history.

(56) References Cited

U.S. PATENT DOCUMENTS

| | | | |
|---|---|---|---|
| 2007/0005596 A1* | 1/2007 | Brown | G06F 16/20 |
| 2009/0327208 A1* | 12/2009 | Bittner | G06F 16/24564 |
| | | | 706/61 |
| 2018/0018579 A1* | 1/2018 | Xu | G06N 20/00 |
| 2021/0026823 A1* | 1/2021 | von Rickenbach | |
| | | | G06F 11/0793 |

* cited by examiner

*Primary Examiner* — Charles Rones
*Assistant Examiner* — Xiaoqin Hu
(74) *Attorney, Agent, or Firm* — GREENBLUM AND BERNSTEIN, P.L.C.

(57) ABSTRACT

A method and system for performing automated data lineage discovery between a source record and a target record within a network are disclosed. The method includes identifying pairs of a source column and a target column, and performing data lineage discovery for each of the pairs for identifying data lineages. The method further includes selecting a target data lineage for at least one pair based on calculated scores for each of the pairs, in which values included in a source column and values included in a target column of the at least one pair consistently correspond to one another. Accordingly, data lineage between the source column and target column of the at least one pair may be determined without knowledge of manipulation performed on the values of the source column for obtaining the values of the target column.

16 Claims, 9 Drawing Sheets

SYSTEM AND METHOD FOR AUTOMATED DISCOVERY OF FINE-GRAIN LINEAGE OF TRANSACTIONAL DATA

TECHNICAL FIELD

This disclosure generally relates to a system and method for providing automated discovery of fine-grain lineage of transactional data. More specifically, this disclosure generally relates to automated discovery of fine-grain lineage of transactional data without preexisting knowledge of any intervening data processing performed between one or more source records and a target record.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Aggregated transaction reports are periodically sent to regulatory authorities to meet regulatory requirements. Accordingly, it is important to ensure that the reported data is of high quality and accuracy in order to avoid fines, reputation damage and remediation costs. An important aspect or component of data quality is data lineage, which refers to the process of determining the provenance of data. Additionally, fine-grain lineage deals with determining the provenance of data at attribute level. Also, fine-grain data lineage is useful to ensure good data/source change management, which may include ensuring that the effects of data attribute changes on downstream dependencies are well understood, and adverse effects are mitigated.

Data moving between a source and a consumer often pass through various intermediate nodes that transform the data. Examples of such transformations may make providing data lineage more challenging, as matching transformed data attributes between source and consumer becomes non-trivial. Accordingly, it may be difficult to discover data lineage without having intricate knowledge of intervening nodes and their transformative processes. One approach to solving this problem may involve analyzing source code at intermediate nodes. However, this approach is not scalable, and source code for some nodes are not readily available.

SUMMARY

According to an aspect of the present disclosure, a method for performing automated data lineage discovery between a source record and a target record within a network is provided. The method includes identifying, by a processor, multiple source tables and at least one target table, in which each of the multiple source tables and the at least one target table includes multiple columns; identifying for each column included in the at least one target table, by the processor and from the multiple source tables and the at least one target table, multiple pairs of a source column and a target column: identifying, by the processor, at least one common key for at least one pair among the multiple pairs: performing, by the processor, at least one preprocessing and augmenting of at least one preprocessing of data included in the at least one pair: performing, by the processor, data lineage discovery for each of the multiple pairs for identifying multiple data lineages: calculating, by the processor, a score for each of the discovered multiple data lineages: selecting, by the processor and among the multiple data lineages, a target data lineage for the at least one pair based on the calculated score, in which values included in a source column and values included in a target column of the at least one pair consistently correspond to one another, and in which the data lineage between the source column and target column of the at least one pair is determined without knowledge of manipulation performed on the values of the source column for obtaining the values of the target column; and displaying, on a display and by the processor, the target data lineage for the at least one pair.

According to another aspect of the present disclosure, the identifying of the at least one common key includes: obtaining a uniqueness score in the target column of the at least one pair: obtaining an intersection score between the target column and the source column of the at least one pair: calculating, by the processor, a common key score using the uniqueness score and the intersection score; and selecting a pair among the multiple pairs with highest common key score as the at least one common key.

According to another aspect of the present disclosure, the uniqueness score is calculated by dividing a number of unique values by a number of all values.

According to yet another aspect of the present disclosure, the intersection score is calculated by a length function, which signify a size or cardinality of an intersection of unique target values and a set of unique source values.

According to another aspect of the present disclosure, the data lineage discovery is performed using multiple data lineage discovery algorithms.

According to a further aspect of the present disclosure, the multiple data lineage discovery algorithms comprises a string-based algorithm, a numerical based algorithm, a categorical algorithm, a constants algorithm, and a combined string-based algorithm.

According to yet another aspect of the present disclosure, a data lineage discovery algorithm is selected among the multiple data lineage discovery algorithms based on values included in the at least one pair of the source column and the target column.

According to a further aspect of the present disclosure, when the at least one common key is determined not to be unique, the at least one preprocessing performed on the at least one common key is flattening of data included in the at least one pair to make the common key unique.

According to another aspect of the present disclosure, the method further includes comparing the calculated score with a preset threshold; determining whether the calculated score is greater than the preset threshold or not; and determining that the data lineage is valid when the calculated score is determined to be greater than the preset threshold.

According to a further aspect of the present disclosure, the method further includes determining whether the calculated score is less than 1.0; when the calculated score is 1.0, determining that the source column and the target column of the at least one pair has a one-to-one lineage; and when the calculated score is less than 1.0, determining that the source column of at least one of multiple source columns in a one-to-many lineage.

According to a further aspect of the present disclosure, the method further includes: when the calculated scored is determined to be above the preset threshold, determining that it is a data lineage candidate, and when the calculated score is determined to be less than 1.0, determining a presence of outliers.

According to a further aspect of the present disclosure, the data lineage includes at least two types of data lineage, including a transaction level lineage and an aggregated data lineage.

According to a further aspect of the present disclosure, column headers of the source column and the target column of the multiple pairs are not utilized in the discovery of the data lineage except when the column headers are combined.

According to a further aspect of the present disclosure, only values included in the source column and the target column of the multiple pairs are utilized in determining a presence of the data lineage.

According to a further aspect of the present disclosure, a data lineage discovery algorithm, among the multiple data lineage discovery algorithms, is applied to each column in a single target table.

According to a further aspect of the present disclosure, the target data lineage is determined for a single target table According to a further aspect of the present disclosure, the target data lineage is determined for a plurality of target tables by iterating over the plurality of target tables According to a further aspect of the present disclosure, a match is determined to exist between the values of the source column and the values of the target column when a same manipulation is applied to a predetermined threshold amount of values in the source column to correspond to the predetermined threshold amount of values in the target column without preexisting knowledge of the manipulation.

According to another aspect of the present disclosure, a non-transitory computer readable storage medium that stores a computer program for performing automated data lineage discovery between a source table and a target table within a network is provided. The computer program, when executed by a processor, causes a system to perform multiple processes including: identifying multiple source tables and at least one target table, in which each of the multiple source tables and the at least one target table includes multiple columns; identifying for each column included in the at least one target table, from the multiple source tables and the at least one target table, multiple pairs of a source column and a target column; identifying at least one common key for at least one pair among the multiple pairs: performing at least one preprocessing and augmenting of at least one preprocessing of data included in the at least one pair: performing data lineage discovery for each of the multiple pairs for identifying multiple data lineages: calculating a score for each of the discovered multiple data lineages; selecting, among the multiple data lineages, a target data lineage for the at least one pair based on the calculated score, in which values included in a source column and values included in a target column of the at least one pair consistently correspond to one another, and in which the data lineage between the source column and target column of the at least one pair is determined without knowledge of manipulation performed on the values of the source column for obtaining the values of the target column; and causing to display, on the display, the target data lineage for the at least one pair.

According to an aspect of the present disclosure, a system to provide for performing automated data lineage discovery between a source table and a target table within a network is provided. The system includes a memory, a display and a processor. The processor is configured to perform: identifying multiple source tables and at least one target table, in which each of the multiple source tables and the at least one target table includes multiple columns; identifying for each column included in the at least one target table, from the multiple source tables and the at least one target table, multiple pairs of a source column and a target column: identifying at least one common key for at least one pair among the multiple pairs: performing at least one preprocessing and augmenting of at least one preprocessing of data included in the at least one pair: performing data lineage discovery for each of the multiple pairs for identifying multiple data lineages: calculating a score for each of the discovered multiple data lineages: selecting, among the multiple data lineages, a target data lineage for the at least one pair based on the calculated score, in which values included in a source column and values included in a target column of the at least one pair consistently correspond to one another, and in which the data lineage between the source column and target column of the at least one pair is determined without knowledge of manipulation performed on the values of the source column for obtaining the values of the target column; and causing to display, on the display, the target data lineage for the at least one pair.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
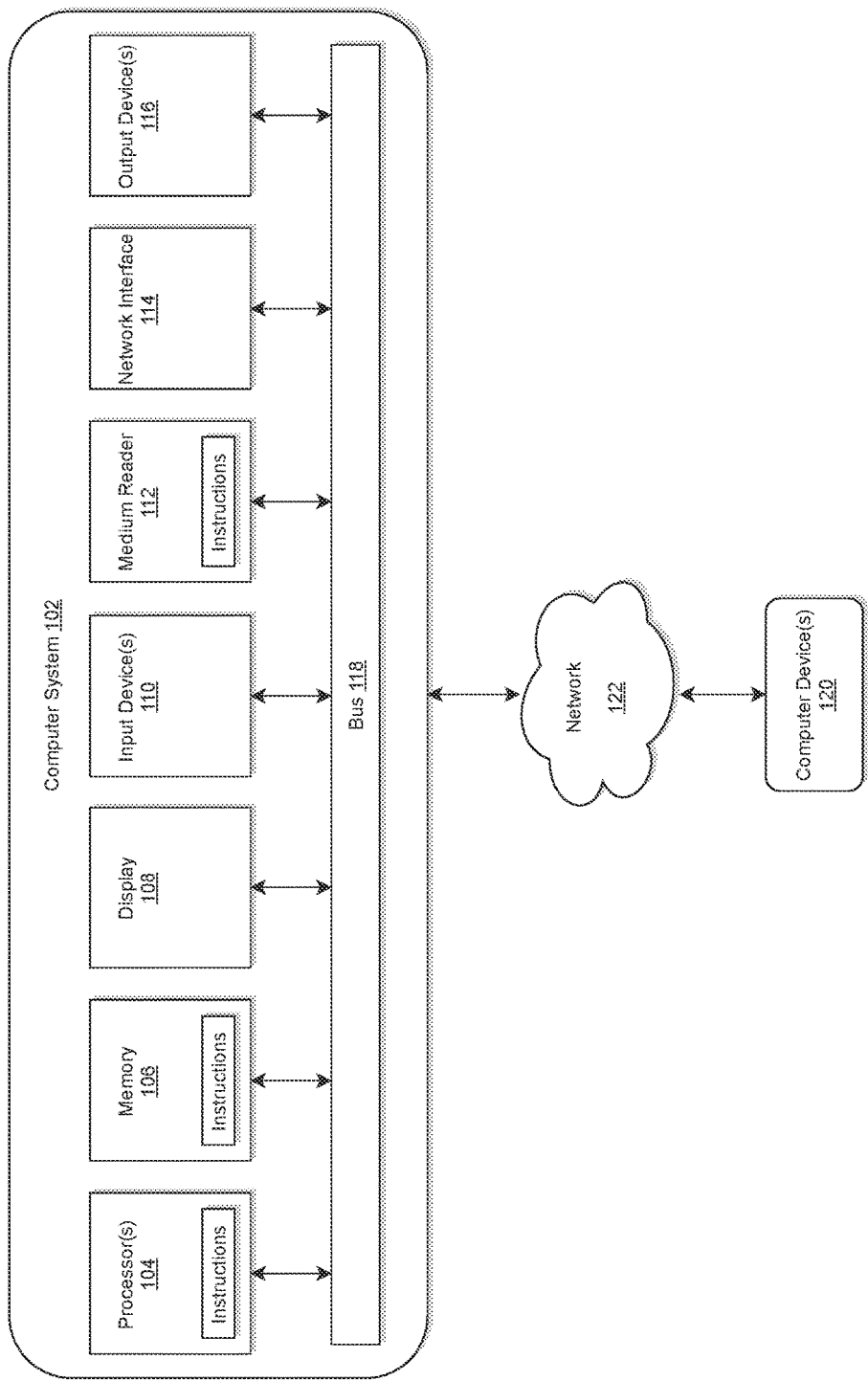
FIG. 1 illustrates a computer system for implementing a fine-grain lineage (FGL) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a fine-grain lineage (FGL) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtopcomputer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
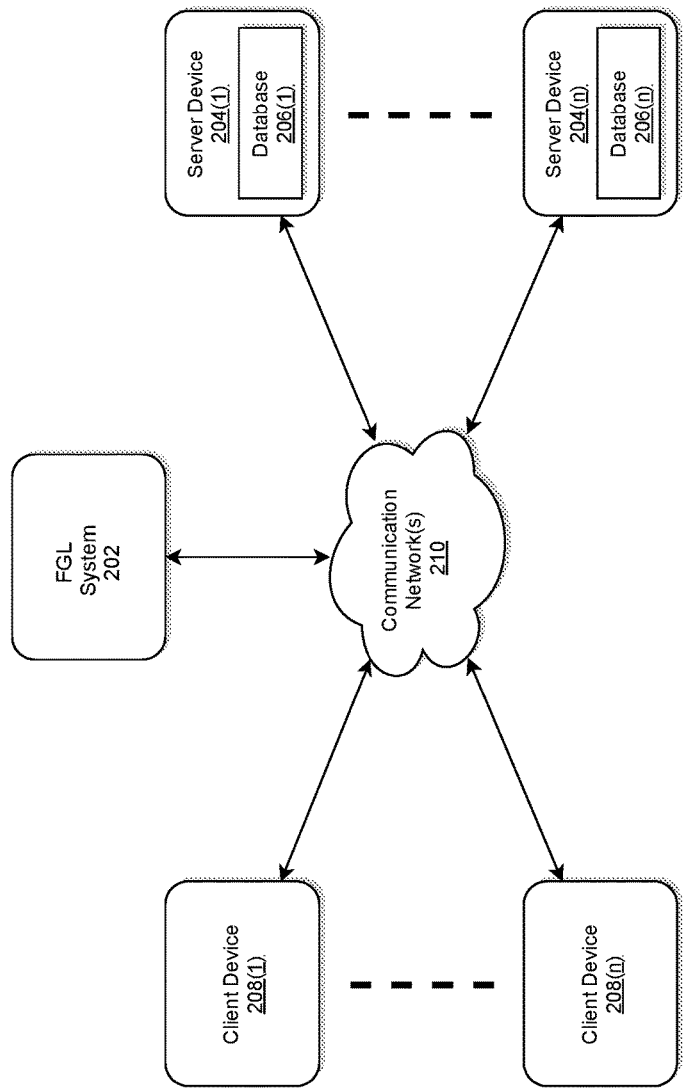
FIG. 2 illustrates an exemplary diagram of a network environment with an FGL system in accordance with an exemplary embodiment.

FIG. 2 illustrates an exemplary diagram of a network environment with a FGL system in accordance with an exemplary embodiment.

A fine-grain lineage (FGL) system 202 may be implemented with one or more computer systems similar to the computer system 102 as described with respect to FIG. 1.

The FGL system 202 may store one or more applications that can include executable instructions that, when executed by the FGL system 202, cause the FGL system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the FGL system 202 itself, may be located in virtual server(s) running in a cloud-based computing environment rather than being tied to one or more specific physical network computing devices. Also, the application(s) may be running in one or more virtual machines (VMs) executing on the FGL system 202. Additionally, in one or more embodiments of this technology, virtual machine(s) running on the FGL system 202 may be managed or supervised by a hypervisor.

In the network environment 200 of FIG. 2, the FGL system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the FGL system 202, such as the network interface 114 of the computer system 102 of FIG. 1, operatively couples and communicates between the FGL system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FGL system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FGL system 202 may be a standalone device or integrated with one or more other devices or apparatuses, such as one or more of the server devices 204(1)-204(n), for example. In one particular example, the FGL system 202 may be hosted by one of the server devices 204(1)-204(n), and other arrangements are also possible. Moreover, one or more of the devices of the FGL system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FGL system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the FGL system 202 that may efficiently provide a platform for implementing a cloud native FGL system module, but the disclosure is not limited thereto.

The client devices 208(1)-208(n) may run interface applications, such as standard web browsers or standalone client applications, which may provide an interface to communicate with the FGL system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FGL system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FGL system 202, the server devices 204(1)-204(n), or the client devices 208(1)-208(n), for example, may be configured to operate as virtual instances on the same physical machine. For example, one or more of the FGL system 202, the server devices 204(1)-204(n), or the client devices 208(1)-208(n) may operate on the same physical device rather than as separate devices communicating through communication network(s) 210. Additionally, there may be more or fewer FGL system 202, server devices 204(1)-204(n), or client devices 208(1)-208(n) than illustrated in FIG. 2. According to exemplary embodiments, the FGL system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
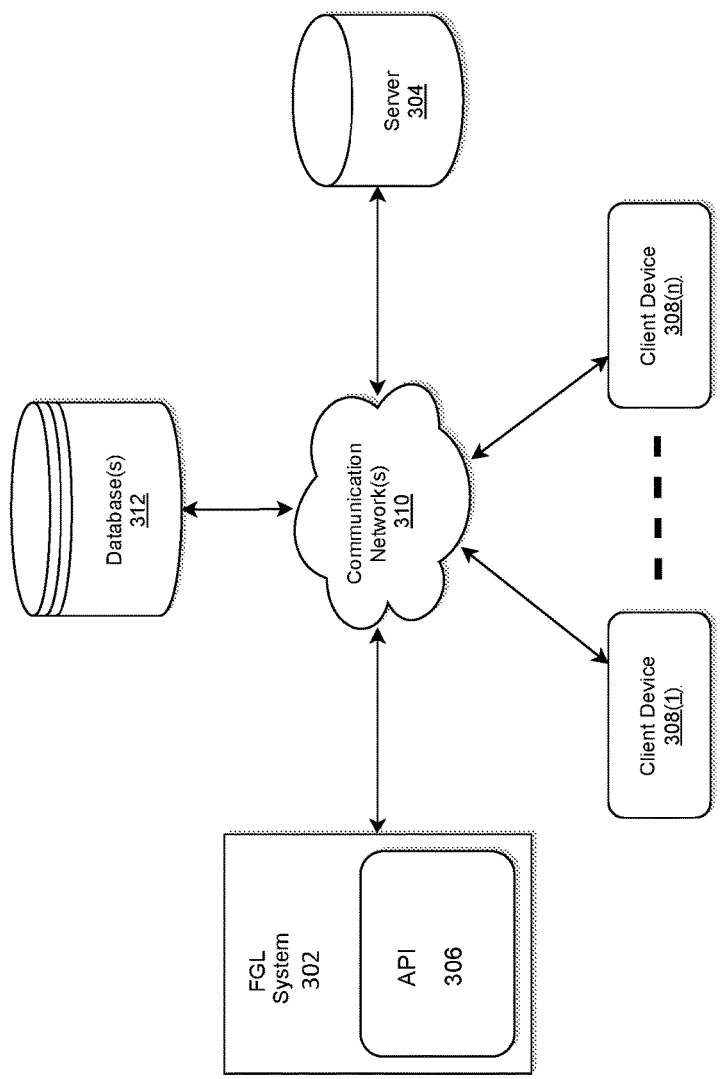
FIG. 3 illustrates a system diagram for implementing an FGL system in accordance with an exemplary embodiment.

FIG. 3 illustrates a system diagram for implementing an FGL system in accordance with an exemplary embodiment.

As illustrated in FIG. 3, the system 300 may include an FGL system 302 within which a group of API modules 306 is embedded, a server 304, a database(s) 312, a plurality of client devices 308(1) . . . 308(n), and a communication network 310.

According to exemplary embodiments, the FGL system 302 including the API modules 306 may be connected to the server 304, and the database(s) 312 via the communication network 310. Although there is only one database that has been illustrated, the disclosure is not limited thereto. Any number of databases may be utilized. The FGL system 302 may also be connected to the plurality of client devices 308(1) . . . 308(n) via the communication network 310, but the disclosure is not limited thereto.

According to exemplary embodiment, the FGL system 302 is described and shown in FIG. 3 as including the API modules 306, although it may include other rules, policies, modules, databases, or applications, for example. According to exemplary embodiments, the database(s) 312 may be embedded within the FGL system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable FGL system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the FGL system 302. In this regard, the plurality of client devices 308(1) . . . 308(n) may be "clients" of the FGL system 302 and are described herein as such. Nevertheless, it is to be known and understood that the plurality of client devices 308(1) . . . 308(n) need not necessarily be "clients" of the FGL system 302, or any entity described in association therewith herein. Any additional or alternative relationship may exist between either or both of the plurality of client devices 308(1) . . . 308(n) and the FGL system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the FGL system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The FGL system 302 may be the same or similar to the FGL system 202 as described with respect to FIG. 2, including any features or combination of features described with respect thereto.

Figure 4:
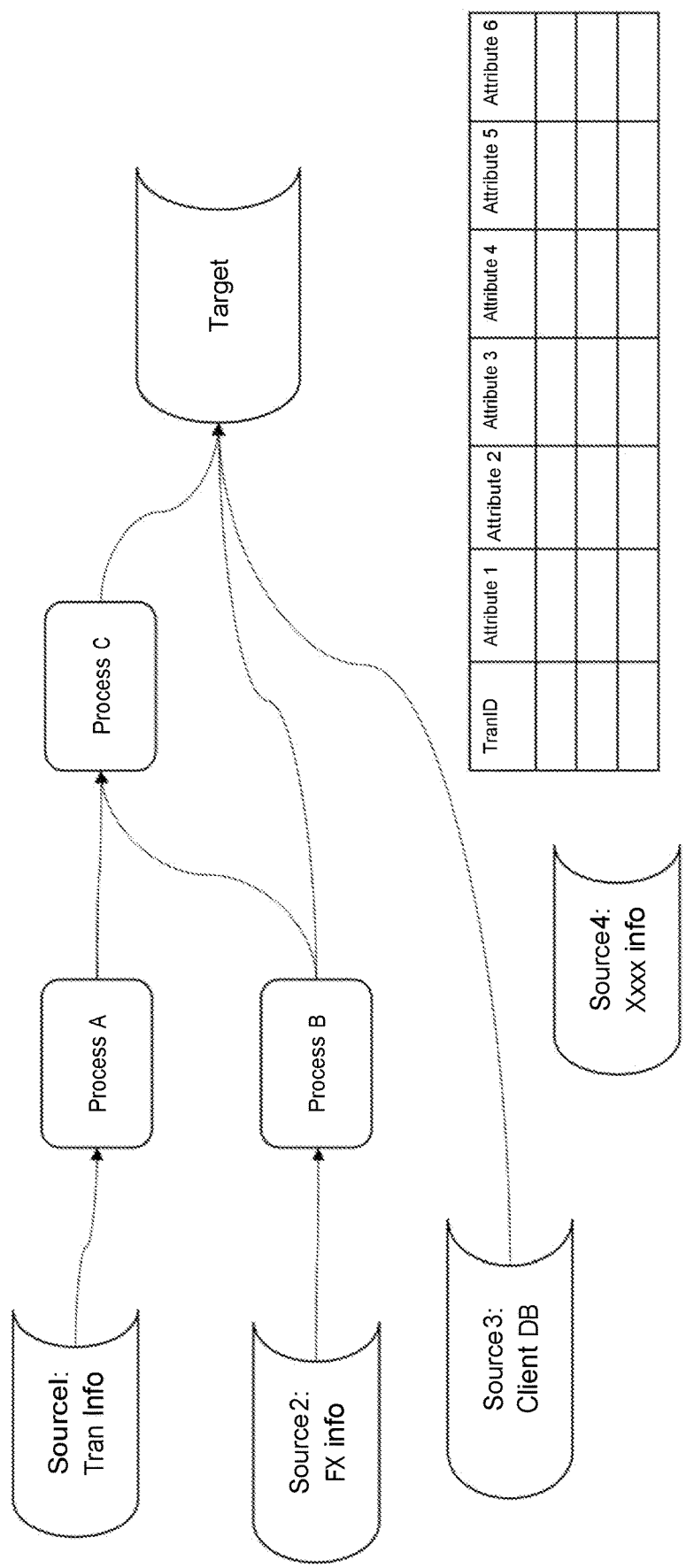
FIG. 4 illustrates an FGL process flow in accordance with an exemplary embodiment.

FIG. 4 illustrates a data overview of fine-grain data lineage in accordance with an exemplary embodiment.

According to exemplary aspects, a target data table may be formed from data from one or more data sources (e.g., servers, records, tables or the like). As exemplarily illustrated in FIG. 4, a target data table may be formed from multiple sources, including Source 1, Source 2 and Source 3. More specifically, the target data table may include one or more columns of data or attributes originating from the Source 1, Source 2 and Source 3. Further, data originating from the source may be provided to the target data table without modification as provided from Source 3 of FIG. 4. Alternatively, data originating from the source may undergo one or more data modification processes (e.g., Process A, Process B, and/or Process C), before being provided to the target data table as processed data. However, when the data from the originating sources undergo one or more data modification processes, which may not be known to the target data table, the data received at the target data table may not be easily recognizable, if at all, as being derived from a particular source record.

However, as exemplarily illustrated by Source 4, not all of the sources may be associated with the data included in the target data table, and may not contribute any data to the target data table.

According to exemplary aspects, the target data table may include multiple columns of data as provided in FIG. 4, such as Attribute 1, Attribute 2, Attribute 3, Attribute 4, Attribute 5, and Attribute 6. According to exemplary aspects, data from each of the six attributes may be organized with a common key, such as a transaction identifier (TranID).

According to exemplary aspects, attributes or a data column in the target data table may be mapped to one or more attributes in one or more sources. Although attributes or columns may be identified by a column header, the column header may not be relied upon for determining of data lineage as header information may be provided in different language, abbreviated, have a different order, different naming conventions and the like. Rather than reliance on the header information, data values included in the respective column are utilized for determining of the data lineage. However, column headers may be relied upon when combining enumerated columns. For example, a combined column header may combine separate column names "Name 1", "Name 2", and "Name 3" into a single column header.

Although aspects of the present disclosure are described with respect to performing data lineage for a single table, aspects are not limited thereto, such that the data lineage method or algorithm may be applied to multiple tables by iterating over the multiple tables.

Figure 5:
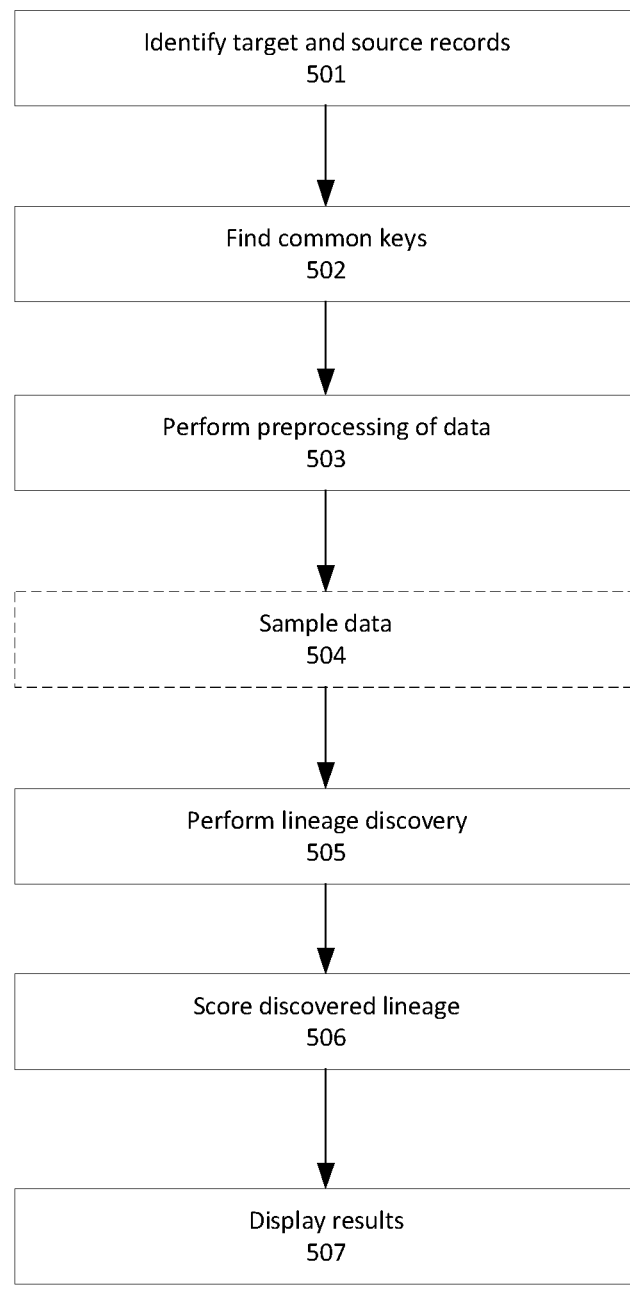
FIG. 5 illustrates a method for discovering a data lineage in accordance with an exemplary embodiment.

FIG. 5 illustrates a system flow diagram in a distributed application environment in accordance with an exemplary embodiment.

In operation 501, one or more target records and a number of source records available across one or more networks are identified. According to exemplary aspects, an FGL system may ingest and identify multiple source data records or tables and a single target data record or table. In an example, a data record or table may be composed of multiple columns. In an example, the source records may be stored on a single server or network, or across multiple servers and/or networks.

In operation 502, one or more common keys are identified between target and source records. In an example, a commonkey may be a primary key or a foreign key. However, aspects of the present disclosure are not limited thereto, such that the common key may be unique.

Figure 6:
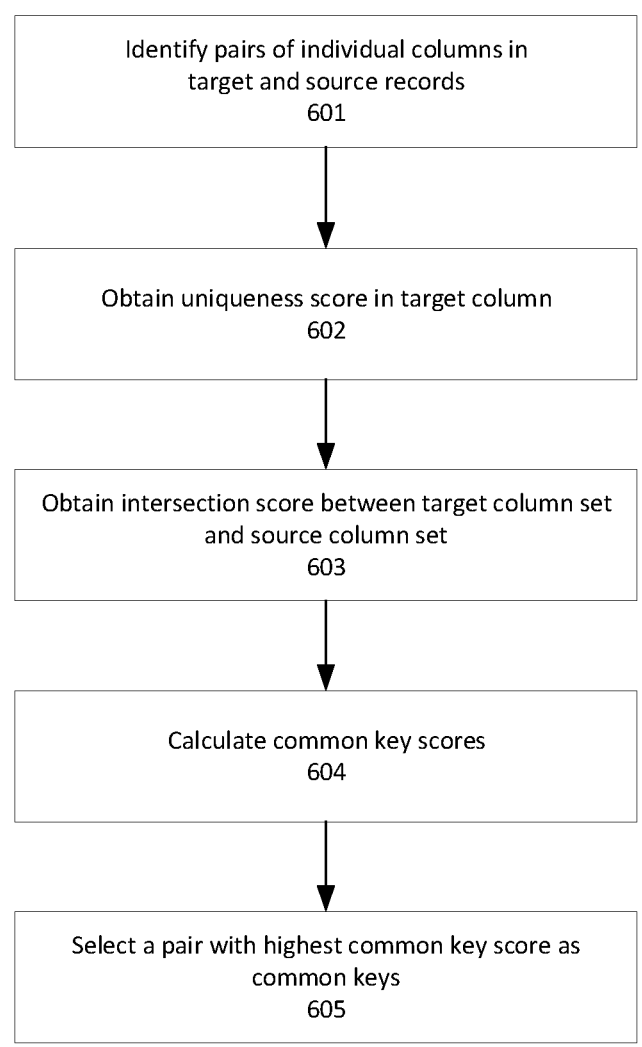
FIG. 6 illustrates a method for finding a common key pair for performing a discovery of a data lineage in accordance with an exemplary embodiment.

According to exemplary aspects, common keys may be identified according to a method illustrated in FIG. 6. FIG. 6 illustrates a method for finding a common key pair for performing a discovery of a data lineage in accordance with an exemplary embodiment.

In operation 601, various pairs or sets of a target column and a source column are identified. In an example, each pair or set may include one target column and one source column. Further, for each pair of individual columns in target and source records, a uniqueness score in the target column may be obtained in operation 602, and an intersection score between the target column and the source column set may be obtained in operation 603.

In an example, a uniqueness score may be calculated by dividing a number of unique values by a number of all values, as illustrated below:

Uniqueness_score=number of unique values/number of all values

Also, in an example, an intersection score may be calculated by a length function, which indicates a size or cardinality of a resulting intersection between a set of unique target values and a set of unique source values, as illustrated below:

Intersection_score=length(unique target values∩unique source values)

Once the uniqueness score and the intersection score is calculated for each set or pair of a target column and a source column, a common key score is calculated in operation 604. In an example, the common key score may be calculated by multiplying the uniqueness score with the intersection score as provided below:

Common key score=Uniqueness_score×Intersection score

Lastly, once the common key scores are calculated, a pair or set of a target column and a source column with the highest common key score is selected as common keys in operation 605.

Returning back to FIG. 5, once the common key is selected, preprocessing is performed in operation 503 to provide for augmented pair or set of augmented target and source data. According to exemplary aspects, preprocessing of data includes parsing values as certain types (e.g., date) and normalizing the parsed valued. In an example, dates may be represented as number of days since a predefined epoch (e.g., date_val—01/01/1900).

Preprocessing of data may additionally include combining of enumerated column names. For example, values in "CName1", "CName2", and "CName3" may be combined to form a new column "CName1+CName2+CName3". According to exemplary aspects, the values in the combined columns may be concatenated as string with a defined delimiter.

Further, preprocessing of data may further include parsing and/or extracting of various information from the obtained data. For example, country codes (and other useful information) may be parsed and extracted from an entity identifier codes.

Additionally, preprocessing of data may also include assigning of a column as containing categorical data. For example, if a set of column values are limited (e.g., two possible values, such as "truck" or "sedan"), the column may be assigned as a categorical column.

According to exemplary aspects, in instances in source records where common key is determined not to be unique, preprocessing may be performed on the common key to flatten records to make the common key unique. Further, records with duplicate common keys may be added as additional columns in an augmented table, with column names changed to, for example, "{Original CName} _1", "{Original CName} _2", and so on, for each additional common key record.

In operation 504, data sampling may be performed. According to exemplary aspects, since transaction records may have been matched between a source record and a target records, lineage may be performed on a subset of the matched records provided as sufficient variation may be present in the sampled data. In an example, intelligent sampling or limited sampling, where a desired amount of variation may be measured, may be preferred as it would utilize less processing and memory resources for providing more efficient utilization of computing resources with faster processing results. According to exemplary aspects, operation 504 may be an optional operation that may or may not be performed.

In operation 505, one or more lineage discovery operations may be performed. According to exemplary aspects, for every column in the target record or table, a lineage discovery algorithm may be executed to search the source attribute space for matches. In an example, the lineage discovery algorithm may be executed to perform one or more data lineage discovery operations according to a data lineage discovery approach. According to exemplary aspects, a match is determined to exist between a target column and a source column when transformation(s) between the values of the target column and values of the source column are consistent. In another words, a match may be determined to exist between values of the source column and values of the target column when the same manipulation is applied to every value in the source column to correspond to every value in the target column even without preexisting knowledge of the manipulation that was performed on the data values of the source column. For example, if the values of the target column and the values of the source column are consistently multiplied by a factor of three, it may be determined that there is a match between the source column and the target column even without knowledge of details of the intervening processing or transactions.

In an example, data lineage processes may be performed in a batch process. Once completed, a report may be generated for the discovered data lineage, corresponding data lineage scores, and outliers/anomalies. Moreover, for the discovered data lineage, a user may be prompted to confirm or deny validity of the discovered data lineage. If the user denies a discovered data lineage, next best data lineage may be provided to the user until a data lineage is accepted. Further, for a discovered data lineage with anomalies or presence of certain threshold of outliers, user may escalate or flag the data having data quality or process issue, or may deem the data lineage as not being an anomaly. In the event the user indicates such data lineage as not being an anomaly, a user may be prompted to submit a lineage logic.

A data lineage may not determine actual transformations performed between the columns of data. Instead, the data lineage determines a relationship between one or more source columns for each target column. In an example, if target $z=f(x, y)$, lineage may not determine f, but only a relationship between the target and the source (e.g., "target z is derived from x and y").

According to exemplary aspects, there may be two types of fine-grain data lineage, namely, a transactional-level data lineage and an aggregated data lineage. In an example, the transactional-level data lineage may refer to lineage of data values where one target record generally maps to one source record. On the other hand, the aggregated data lineage may refer to lineage of data values where one target record is some aggregation of multiple source records.

According to exemplary aspects, for each pair or set of columns in augmented target and source records, a number of lineage discovery operations may be conducted to determine a data lineage. Lineage may expect consistency in the transformation between matched source and target values as determined by the lineage discovery operations.

According to exemplary aspects, a target column may be adjudged to have been derived from a source column if the ratio of values consistent with one of the selected transformations is beyond a certain threshold. Beyond that threshold, matched records that follow the transformation may be labeled as inliers or other similar terms. However, those that defy the transformation may be labeled as outliers or other similar terms. Further, the matched records may be displayed to a user via an interface. Users may then investigate for errors in the data or in the process. However, aspects of the present disclosure are not limited thereto, such that one or more machine learning (ML) or artificial intelligence (AI) algorithms or models may be utilized to investigate errors in the data or in the process.

In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, and the like. In another exemplary embodiment machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Figure 7A:
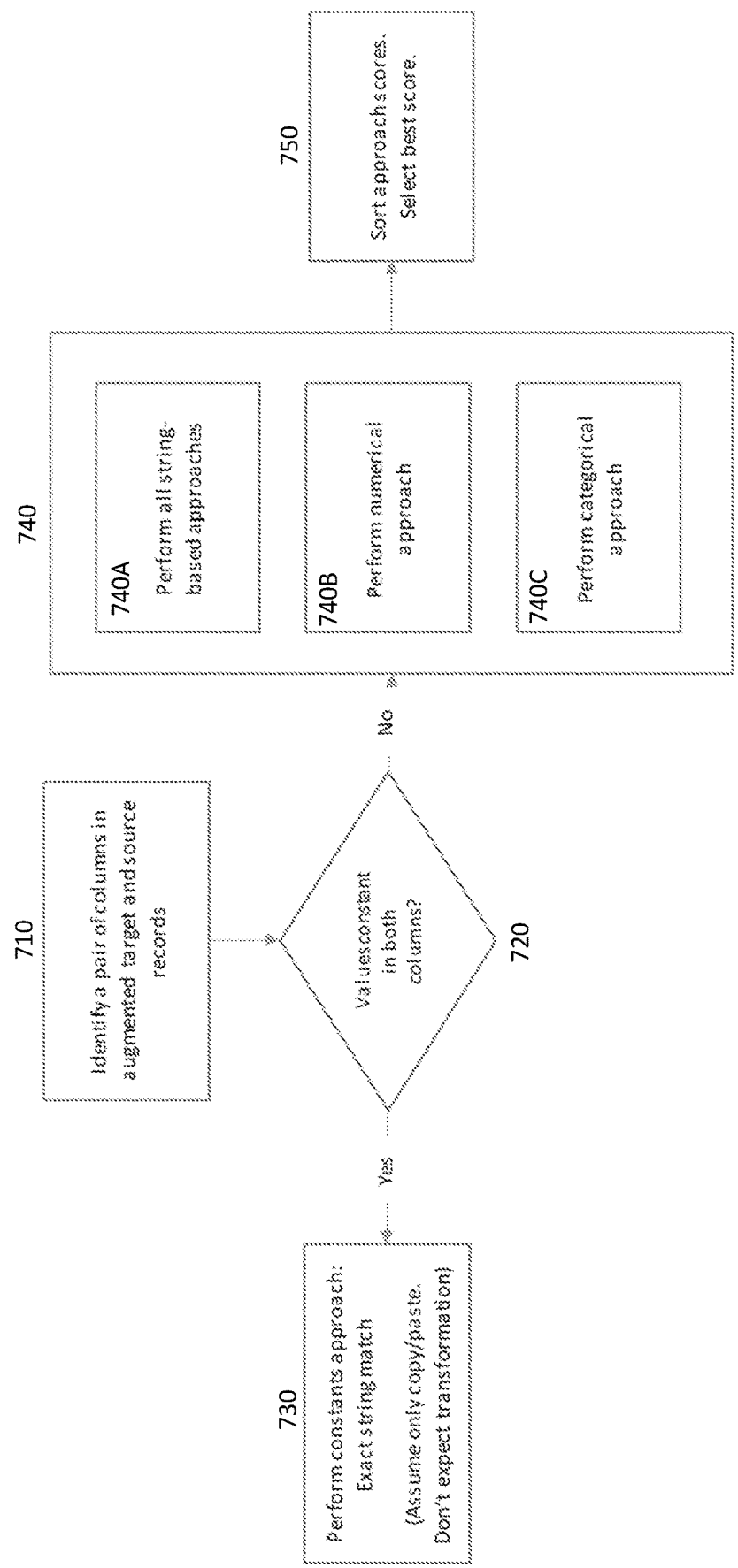
FIGS. 7A-B illustrate a method for selecting a lineage discovery approach for performing a discovery of a data lineage in accordance with an exemplary embodiment.
Figure 7B:
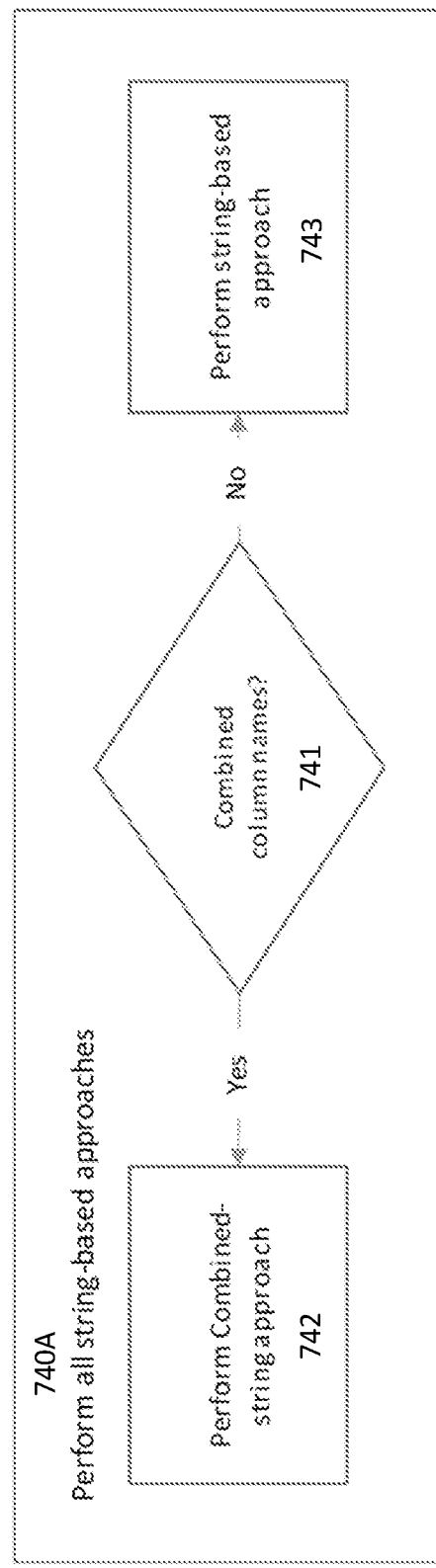

Referring back to operation 505 of FIG. 5, one or more data lineage discovery operations may be selected for execution or performance according to a method illustrated in FIGS. 7A-B. FIGS. 7A-B illustrate a method for selecting a lineage discovery approach for performing a discovery of a data lineage in accordance with an exemplary embodiment.

In operation 710, a pair or set of columns in augmented target and source records is identified. Each pair or set of columns may then be analyzed in accordance with one or more data lineage discovery approaches or algorithms based on values included in the pair or set of columns.

According to exemplary aspects, lineage discovery approaches or algorithms may include, a string-based approach or algorithm, a numerical-based approach or algorithm, a categorical approach or algorithm, a combined-string approach or algorithm, and a constants approach or algorithm. However, aspects of the present disclosure are not limited thereto, such that other lineage discovery approaches may be utilized.

In operation 720, it is determined whether the pair of columns include value constant. If the pair of columns is determined to include value constants in operation 720, constants approach is selected as the data lineage discovery approach and performed in operation 730. According to exemplary aspects, the constants approach may be utilized since lineage may not be determined on constants since the above noted approaches capture how changes in the source records translates to changes in the target records. If all of the records in a target column are constant, they may ostensibly be derived from any of source columns that also happen to be constant. There is, however, one case where constants are acceptable: when the string values of the constants in the source column is the same as the string values of the target column. In such a case, it is assumed that the values are simply copied or are hardcoded. In an example, only copy and paste operation is assumed and transformation in data is not expected.

On the other hand, if it is determined that the pair of columns do not include value constant, then the method proceeds to operation 740. In operation 740, one or more of a string base approach among all string-based approaches 740A, a numerical approach 740B, and a categorical approach 740C may be performed for determining a score for one or more data lineage candidates.

According to exemplary aspects, one of a string-based approach or a combined-string approach may be selected in the all string-based approaches 740A according to a method illustrated in FIG. 7B.

In operation 741, a determination as to whether enumerated column names in the source record are combined into a single column, and its values are concatenated in preprocessing. For example, column names of "CName1", "CName2", "CName3" may be combined to a new column name "CName1+CName2+CName3", and the values in the columns may be concatenated as string with a defined delimiter. If it is determined that the multiple column names in the source record are combined into a single column, then the method proceeds to operation 742 and performs a combined string data approach as the data lineage discovery approach. In an example, the combined string data approach finds target values within the concatenated source strings. This approach may be useful when there is no string enforcement in data entry for grouped data, such as multiline addresses.

If it is determined that combined column name is not present in operation 741, the method proceeds to operation 743. In other words, in operation 741, it is determined whether the columns include string-based values. If the columns include string-based values, a string-based approach is selected as the data lineage discovery approach and performed in operation 743. According to exemplary aspects, the string-based approach may take the string difference between columns of matched records in the source and target records, resulting in a difference substring. An alternative approach may find the position of the shorter of the two matched strings within the longer one. This position is expected to be consistent for an append function. In an example, both approaches may be applied and the approach that returns fewer outliners may be selected.

In operation 740B, the numerical approach is selected as the data lineage discovery approach and performed. According to exemplary aspects, the numerical approach may expect a numerical transformation between the source and target records. The numerical approach extracts a fitted line (or curve in general terms) between source values and target values. The fitted line is then reapplied to the source values. Target values that fall on the line (within a tolerance value) may be labeled as inliers, while those that do not are deemed as outliers. A line fitting method or a regression model may be utilized to fit the curve.

In operation 740C, the categorical approach is selected as the data lineage discovery approach and performed. According to exemplary aspects, the categorical approach may be utilized for cases where there is not a string based or numerical transformation between source and target values. This may be seen where symbols represents values (e.g., "T" for "Truck" and "S" for "Sedan") or where there is translation between languages. In these cases, the target cannot be reliably derived from the source. Such an approach may first convert the values into a categorical representation, where identical values are assigned the same categorical value. The categorical values for source and target are then compared. Records for which categorical values are the same are labeled as inliers, and otherwise outliers.

In operation 750, after the data lineage approaches are performed in operation 740, scores for the one or more of the string-based approach among all string-based approaches 740A, the numerical approach 740B, and the categorical approach 740C are calculated. Further, the calculated scores are then sorted, and a data lineage candidate with the best or highest score is selected as the data lineage. Moreover, calculated scores, data lineage candidates, selected data lineage and the like may be displayed on a screen.

Figure 8:
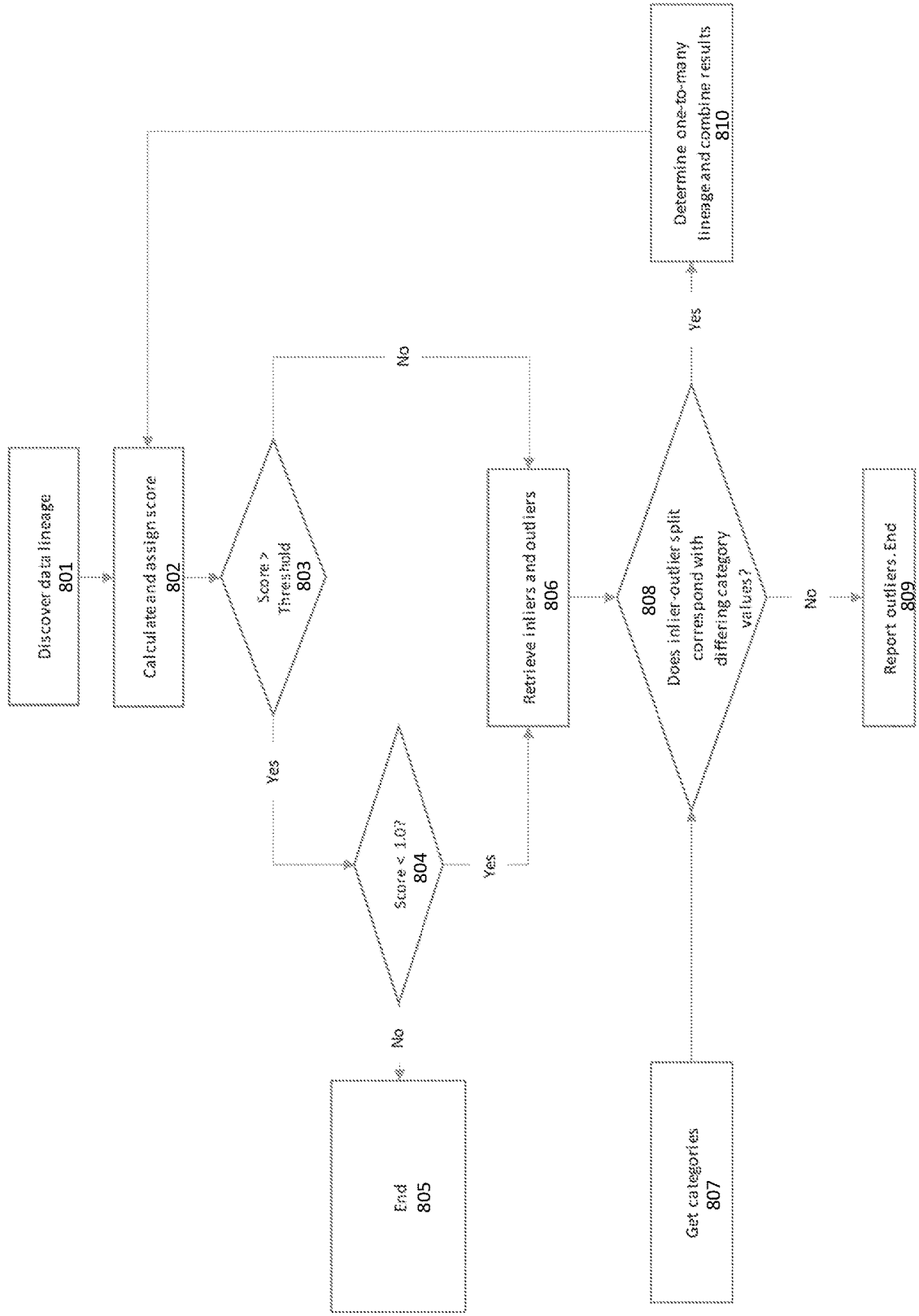
FIG. 8 illustrates a method for scoring a data lineage and processing the data lineage based on the assigned score in accordance with an exemplary embodiment.

Referring back to FIG. 5, once a data lineage is discovered, a score is determined for the discovered data lineage and is assigned thereto in operation 506. A more detailed description of a method for determining a score for a data lineage is provided with respect to FIG. 8. FIG. 8 illustrates a method for scoring a data lineage and processing the data lineage based on the assigned score in accordance with an exemplary embodiment.

In operation 801, a discovered data lineage is identified for assigning a score. In operation 802, a score is calculated for the discovered data lineage and applied to the discovered data lineage. According to exemplary aspects, a score may be calculated based on a ratio of number of inlier records to a total number of records. However, aspects of the present disclosure are not limited thereto, such that other suitable methodology may be utilized for determining and assigning a score.

In operation 803, a determination is made as to whether the calculated score is greater than a preset threshold. If the calculated score is determined to be greater than the preset threshold, the lineage may be determined to be valid, and the method proceeds to operation 804.

On the other hand, if the calculated score is determined to be less than or equal to the threshold, then the method proceeds to operation 806 for retrieving inliers and outliers. In an example, non-inlier values may be determined to be outliers. Presence of outliners may or may not invalidate the data lineage, as outliers may result from erroneous data or processing. In such a case, identifying or highlighting outlier records may be beneficial for improving data quality.

Referring back to operation 804, further determination as to whether the calculated score that is greater than the threshold (as determined in operation 803) is also less than 1.0. According to further aspects, a lineage score may be higher than a threshold value for multiple source columns. If the calculated score is determined to be 1.0 (i.e., calculated score is not less than 1.0) in operation 804, in the method proceeds to operation 805 and terminates. On the other hand, if the lineage score is determined to be greater than the threshold (as determined in operation 803), but less than 1.0 in operation 804, the method proceeds to operation 806 for retrieval of inliers and outliers.

In operation 807, categories are obtained by executing a get categories function. In operation 808, after retrieving the inliers and outliers in operation 806 and obtaining categories in operation 807, a determination of whether inlier-outlier split corresponds with differing category values.

In operation 808, if it is determined that the inlier-outlier split does not correspond with differing category values, the method determines one-to-one lineage and outliers are reported in operation 809.

On the other hand, if it is determined that the inlier-outlier split corresponds with differing category values, the method determines one-to-many lineage and results are combined in operation 810. Afterwards, the method proceeds to operation 802.

According to exemplary aspects, one column in a target record may map to two or more columns in a source record for establishing a one-to-many lineage. To discover one-to-many lineage, categories identified in a preprocessing step may be employed. In an example, one-to-many lineage may be conditional on a categorical column in the source (e.g., if payment_type="CREDIT"; then target_amount=source_credit_amount; else target_amount=source_debit_amount: where payment_type was determined in preprocessing to be a categorical column).

In the one-to-many lineage scenario, only target columns with lineage score in the range of 1.0>lineage score>1-to-n_threshold. 1-to-n_threshold may be considered as being different from the preset threshold, and preferably much less to allow for capturing complete lineage when instances of a lineage condition are not abundant.

According to exemplary aspects, a categorical column may be determined to contain a condition for a one-to-many lineage by performing the following operations. After a first lineage discovery pass, a source column with the highest score may be selected. Then inliers and outliers may be retrieved, and a categorical column may be identified for which a category value is different for inlier and outlier records. Such categorical column may be determined to contain the condition for the one-to-many lineage. Further, applying the same transformation discovery method as the initial lineage discovery pass, source column with the highest score may be iteratively found when transformation method is applied to the previous step's outliers filtered by the remaining categories.

Referring back to FIG. 5, results based on determined score of the discovered data lineage are displayed on a display interface in operation 507.

Although the above noted aspects were described with respect to transaction level data lineage, aspects of the present disclosure are not limited thereto. According to exemplary aspects, transaction-level information may be lost when data is aggregated. In the aggregated data lineage discovery, preprocessing and augmentation may be carried out on a source record, similarly to the method performed in transactional-level lineage. However, since the aggregated data lineage is interested in mapping aggregated data, a set of known aggregation of the columns may be performed. The set of known aggregations may include, without limitation, sums and means calculated monthly, quarterly and yearly, across categories determined in the preprocessing operation. According to exemplary aspects, lineage of aggregated data may be achieved by calculating an intersection score between the source and target column pairs or sets. For example, for each target column, a lineage may be selected as the source column for which the intersection between source and target values is the highest, and is above a predefined threshold.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing automated data lineage discovery between a source record and a target record within a network, the method comprising:
   identifying, by a processor, a plurality of source records and at least one target record, wherein each of the plurality of source records and the at least one target record includes a plurality of columns, wherein the at least one target record is formed from data from the plurality of source records, wherein data from each of the plurality of columns is associated with a common key, and wherein the common key is a transaction identifier;
   identifying, by the processor and from the plurality of source records and the at least one target record, a plurality of pairs of a source column and a target column for each column included in the at least one target record;
   identifying, by the processor, at least one common key pair for at least one pair of a source column and a target column among the plurality of pairs, wherein the identifying of the at least one common key pair includes:
   performing the following operations for each pair of the plurality of pairs:
      obtaining a uniqueness score in the target column of the particular pair, wherein the uniqueness score is determined by dividing a number of unique values in the target column by a number of all values in the target column;
      obtaining an intersection score between the target column and the source column of the particular pair, wherein the intersection score is calculated by a length function that indicates a size or cardinality of a resulting intersection between a set of unique values of the target column and a set of unique values of the source column;
      calculating, by the processor, a common key score for the particular pair using the uniqueness score and the intersection score, wherein the common key score is calculated by a product of the uniqueness score and the intersection score; and
   selecting a pair among the plurality of pairs with highest common key score as the at least one pair;
   performing, by the processor and based on the at least one common key pair identified, at least one preprocessing of data included in the at least one pair for augmentation;
   performing, by the processor and by using the at least one common key pair, data lineage discovery for each of the at least one pair among the plurality of pairs for identifying one or more data lineages;
   calculating, by the processor, a data lineage score for each of the one or more data lineages;
   selecting, by the processor and among the one or more data lineages, a target data lineage for the at least one pair based on the calculated data lineage score, wherein values included in a source column and values included in a target column of the at least one pair consistently correspond to one another, and wherein the target data lineage between the source column and the target column of the at least one pair is determined without knowledge of manipulation performed on the values of the source column for obtaining the values of the target column for more efficient determination of the target data lineage; and
   displaying, on a display and by the processor, the target data lineage for the at least one pair.

2. The method according to claim 1, wherein the data lineage discovery is performed using a plurality of data lineage discovery algorithms.

3. The method according to claim 2, wherein the plurality of data lineage discovery algorithms comprises a string-based algorithm, a numerical based algorithm, a categorical algorithm, a constants algorithm, and a combined string-based algorithm.

4. The method according to claim 2, wherein a data lineage discovery algorithm is selected among the plurality of data lineage discovery algorithms based on value included in the at least one pair of the source column and the target column.

5. The method according to claim 1, further comprising:
   comparing the calculated data lineage score with a preset threshold;
   determining whether the calculated data lineage score is greater than the preset threshold or not; and determining that the target data lineage is valid when the calculated data lineage score is determined to be greater than the preset threshold.

6. The method according to claim 5, further comprising:
determining whether the calculated data lineage score is less than 1.0;
when the calculated data lineage score is 1.0, determining that the source column and the target column of the at least one pair have a one-to-one lineage; and
when the calculated data lineage score is less than 1.0, determining that the target column and the source column in connection with at least one other source column of a plurality of source columns have a one-to-many lineage.

7. The method according to claim 5, further comprising: when the calculated data lineage score is determined to be less than 1.0, determining a presence of outliers.

8. The method according to claim 1, wherein the target data lineage includes at least two types of data lineage, including a transaction level lineage and an aggregated data lineage.

9. The method according to claim 1, wherein column headers of the source column and the target column of the plurality of pairs are not utilized in the data lineage discovery of the target data lineage except when a plurality of the column headers are combined.

10. The method according to claim 1, wherein only values included in the source column and the target column of the plurality of pairs are utilized in determining a presence of the target data lineage.

11. The method according to claim 2, wherein a data lineage discovery algorithm, among the plurality of data lineage discovery algorithms, is applied to each column in a single target table.

12. The method according to claim 1, wherein the target data lineage is determined for a single target table.

13. The method according to claim 1, wherein the target data lineage is determined for a plurality of target tables by iterating over the plurality of target tables.

14. The method according to claim 1, wherein a match is determined to exist between the values of the source column and the values of the target column when a same manipulation is applied to every value in the source column to correspond to every value in the target column without preexisting knowledge of the manipulation.

15. A system to provide for performing automated data lineage discovery between a source record and a target record within a network, the system comprising:
a memory;
a display; and
a processor configured to perform:
identifying a plurality of source records and at least one target record, wherein each of the plurality of source records and the at least one target record includes a plurality of columns, wherein the at least one target record is formed from data from the plurality of source records, wherein data from each of the plurality of columns is associated with a common key, and wherein the common key is a transaction identifier;
identifying, from the plurality of source records and the at least one target record, a plurality of pairs of a source column and a target column for each column included in the at least one target record;
identifying at least one common key pair for at least one pair of a source column and a target column among the plurality of pairs, wherein the identifying of the at least one common key pair includes:
performing the following operations for each pair of the plurality of pairs:
obtaining a uniqueness score in the target column of the particular pair, wherein the uniqueness score is determined by dividing a number of unique values in the target column by a number of all values in the target column;
obtaining an intersection score between the target column and the source column of the particular pair, wherein the intersection score is calculated by a length function that indicates a size or cardinality of a resulting intersection between a set of unique values of the target column and a set of unique values of the source column;
calculating, by the processor, a common key score for the particular pair using the uniqueness score and the intersection score, wherein the common key score is calculated by a product of the uniqueness score and the intersection score; and
selecting a pair among the plurality of pairs with highest common key score as the at least one pair;
performing, based on the at least one common key pair identified, at least one preprocessing of data included in the at least one pair for augmentation;
performing, by using the at least one common key pair, data lineage discovery for each of the at least one pair among the plurality of pairs for identifying one or more data lineages;
calculating a data lineage score for each of the one or more data lineages;
selecting, among the one or more data lineages, a target data lineage for the at least one pair based on the calculated data lineage score, wherein values included in a source column and values included in a target column of the at least one pair consistently correspond to one another, and wherein the target data lineage between the source column and the target column of the at least one pair is determined without knowledge of manipulation performed on the values of the source column for obtaining the values of the target column for more efficient determination of the target data lineage; and
causing to display, on the display, the target data lineage for the at least one pair.

16. A non-transitory computer readable storage medium that stores a computer program for performing automated data lineage discovery between a source record and a target record within a network, the computer program, when executed by a processor, causing a system to perform a plurality of processes comprising:
identifying a plurality of source records and at least one target record, wherein each of the plurality of source records and the at least one target record includes a plurality of columns, wherein the at least one target record is formed from data from the plurality of source records, wherein data from each of the plurality of columns is associated with a common key, and wherein the common key is a transaction identifier;
identifying, from the plurality of source records and the at least one target record, a plurality of pairs of a source column and a target column for each column included in the at least one target record;

identifying at least one common key pair for at least one pair of a source column and a target column among the plurality of pairs, wherein the identifying of the at least one common key pair includes:
  performing the following operations for each pair of the plurality of pairs:
    obtaining a uniqueness score in the target column of the at least one particular pair, wherein the uniqueness score is determined by dividing a number of unique values in the target column by a number of all values in the target column;
    obtaining an intersection score between the target column and the source column of the particular pair, wherein the intersection score is calculated by a length function that indicates a size or cardinality of a resulting intersection between a set of unique values of the target column and a set of unique values of the source column;
    calculating, by the processor, a common key score for the particular pair using the uniqueness score and the intersection score, wherein the common key score is calculated by a product of the uniqueness score and the intersection score; and
  selecting a pair among the plurality of pairs with highest common key score as the at least one pair;

performing, based on the at least one common key pair identified, at least one preprocessing of data included in the at least one pair for augmentation;

performing, by using the at least one common key pair, data lineage discovery for each of the at least one pair among the plurality of pairs for identifying one or more data lineages;

calculating a data lineage score for each of the one or more data lineages;

selecting, among the one or more data lineages, a target data lineage for the at least one pair based on the calculated data lineage score, wherein values included in a source column and values included in a target column of the at least one pair consistently correspond to one another, and wherein the target data lineage between the source column and the target column of the at least one pair is determined without knowledge of manipulation performed on the values of the source column for obtaining the values of the target column for more efficient determination of the target data lineage; and causing to display, on a display, the target data lineage for the at least one pair.

* * * * *